US011763421B2

(12) United States Patent
Wu et al.

(10) Patent No.: US 11,763,421 B2
(45) Date of Patent: Sep. 19, 2023

(54) CIRCUIT FOR COMBINED DOWN SAMPLING AND CORRECTION OF IMAGE DATA

(71) Applicant: Apple Inc., Cupertino, CA (US)

(72) Inventors: Chihsin Wu, San Jose, CA (US); David R. Pope, Campbell, CA (US); Sheng Lin, San Jose, CA (US); Amnon D. Silverstein, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 193 days.

(21) Appl. No.: 17/143,995

(22) Filed: Jan. 7, 2021

(65) Prior Publication Data

US 2022/0215506 A1    Jul. 7, 2022

(51) Int. Cl.
*G06T 3/40*    (2006.01)
*H04N 23/88*    (2023.01)

(52) U.S. Cl.
CPC ........... *G06T 3/4007* (2013.01); *H04N 23/88* (2023.01)

(58) Field of Classification Search
CPC ............... H04N 9/045; H04N 9/04517; H04N 9/04515; H04N 9/0455; H04N 9/04551; H04N 9/04557; H04N 5/3572; H04N 5/357; H04N 5/217; H04N 1/56; H04N 1/52; H04N 1/58; H04N 1/62; H04N 5/23264; H04N 9/64; H04N 9/646; H04N 9/68; H04N 9/0451; G06T 3/4015; G06T 5/00;

(Continued)

(56) References Cited

U.S. PATENT DOCUMENTS 6,323,934 B1    11/2001   Enomoto
7,751,642 B1     7/2010   Persson
(Continued)

FOREIGN PATENT DOCUMENTS

EP           2421248 A2     2/2012
WO    WO 2020/260574 A1   12/2020

OTHER PUBLICATIONS

Blueman, D. J., "Chromatic Aberration Recovery on Arbitrary Images," University of Bristol Department of Computer Science, Sep. 2011, pp. 1-92.

(Continued)

*Primary Examiner* — Ian L Lemieux
*Assistant Examiner* — Woo C Rhim
(74) *Attorney, Agent, or Firm* — Sterne, Kessler, Goldstein & Fox P.L.L.C.

(57) ABSTRACT

A foveated down sampling and correction (FDS-C) circuit for combined down sampling and correction of chromatic aberrations in images. The FDS-C circuit performs down sampling and interpolation of pixel values of a first subset of pixels of a color in a raw image using down sampling scale factors and first interpolation coefficients to generate first corrected pixel values for pixels of the color in a first corrected version of the raw image. The FDS-C circuit further performs interpolation of pixel values of a second subset of the pixels in the first corrected version using second interpolation coefficients to generate second corrected pixel values for pixels of the color in a second corrected version of the raw image. Pixels in the first subset are arranged in a first direction, pixels in the second subset are arranged in a second direction, and the down sampling scale factors vary along the first direction.

20 Claims, 10 Drawing Sheets

(58) Field of Classification Search
CPC ......... G06T 5/001; G06T 5/006; G06T 5/003; G06T 3/40; G06T 3/4007; H01L 27/146; G02B 27/0025; G02B 27/005
See application file for complete search history.

(56) References Cited

U.S. PATENT DOCUMENTS

| | | | |
|---|---|---|---|
| 8,055,070 | B2 | 11/2011 | Bassi et al. |
| 9,105,090 | B2 | 8/2015 | Haribhatt et al. |
| 9,210,391 | B1 | 12/2015 | Mills |
| 10,157,448 | B2 | 12/2018 | Nauven et al. |
| 10,643,307 | B2 | 5/2020 | Chen et al. |
| 2002/0012054 | A1* | 1/2002 | Osamato ............ H04N 9/04557 386/E5.072 |
| 2002/0012055 | A1* | 1/2002 | Koshiba ................ G06T 3/4015 386/E5.072 |
| 2004/0001146 | A1* | 1/2004 | Liu ....................... G06T 3/0062 348/207.99 |
| 2005/0174441 | A1* | 8/2005 | Acharya .............. H04N 23/843 348/222.1 |
| 2010/0002958 | A1* | 1/2010 | Wu ....................... G06T 3/4092 382/299 |
| 2011/0091101 | A1* | 4/2011 | Cote ..................... H04N 5/367 382/167 |
| 2011/0149110 | A1 | 6/2011 | Sugiyama |
| 2011/0317047 | A1* | 12/2011 | Stanhill ..................... G06T 1/20 382/167 |
| 2012/0155761 | A1* | 6/2012 | Matsuoka ............... G06T 5/007 382/167 |
| 2013/0050544 | A1 | 2/2013 | Kano |
| 2013/0321675 | A1* | 12/2013 | Cote .................. H04N 5/23206 382/167 |
| 2015/0036917 | A1 | 2/2015 | Nanri et al. |
| 2015/0271355 | A1 | 9/2015 | Matsumoto |
| 2015/0334360 | A1 | 11/2015 | Okudera |
| 2019/0066275 | A1 | 2/2019 | Ito |
| 2020/0351460 | A1* | 11/2020 | Cote ................ H04N 5/232939 |

OTHER PUBLICATIONS

Hoffman, D. et al., "Limits of peripheral acuity and implications for VR system design," Journal of the Society for Information Display 26.8, Aug. 2018, pp. 483-495.

Menon, D. et al., "Demosaicing With Directional Filtering and a posteriori Decision," IEEE Transactions on Image Processing, vol. 16, No. 1, Jan. 2007, pp. 132-141.

PCT International Search Report and Written Opinion, PCT Application No. PCT/US2021/063099, dated Mar. 16, 2022, Mar. 16, 2022, 14 pages.

Zhang, L. et al., "Color Reproduction From Noisy CFA Data of Single Sensor Digital Cameras," IEEE Transactions on Image Processing, vol. 16, No. 9, Sep. 2007, pp. 2184-2197.

* cited by examiner

CIRCUIT FOR COMBINED DOWN SAMPLING AND CORRECTION OF IMAGE DATA

BACKGROUND

1. Field of the Disclosure

The present disclosure relates to a circuit for processing image data, and more specifically to a circuit for combined down sampling and correction of image data to correct chromatic aberrations in captured images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

However, image processing pipelines do not account for the use of a wide-angle lens (e.g., a fisheye lens) to generate the image data. When a wide-angle lens is used to generate the image data, the refraction angle of light with different wavelength varies thereby manifesting itself on the image sensor as shifted focal points that are not aligned among red, green, and blue color channels. Thus, color fringing is present at sharp and high contrast edges of full-color images generated from the image data.

SUMMARY

Embodiments relate to an image processor that includes a foveated down sampling and correction circuit for correcting chromatic aberrations in images captured by one or more image sensors coupled to the image processor. The foveated down sampling and correction circuit includes a first correction circuit (e.g., a vertical foveated down sampling and correction circuit) and a second correction circuit (e.g., a horizontal correction circuit) coupled to the first correction circuit. The first correction circuit performs down sampling and interpolation of pixel values of a first subset of pixels of a same color in a raw image using first down sampling scale factors and first interpolation coefficients to generate first corrected pixel values for pixels of the same color in a first corrected version of the raw image. The pixels in the first subset are arranged in a first direction (e.g., vertical direction), the first down sampling scale factors gradually vary along the first direction, and the first interpolation coefficients correspond to first offset values. The first offset values represent first distances from each down sampling pixel location along the first direction to corresponding first virtual pixels in the first direction.

The second correction circuit receives the first corrected pixel values of the first corrected version and performs interpolation of pixel values of a second subset of the pixels in the first corrected version using second interpolation coefficients to generate second corrected pixel values for pixels of the same color in a second corrected version of the raw image. The pixels in the second subset are arranged in a second direction (e.g., horizontal direction) perpendicular to the first direction, and the second interpolation coefficients correspond to second offset values. The second offset values represent second distances from the second subset of pixels to corresponding second virtual pixels in the second direction.

In some embodiments, the image processor further includes a down sampling circuit coupled to the second correction circuit. The down sampling circuit receives the second corrected pixel values for pixels of the same color in the second corrected version. The down sampling circuit performs down sampling of a subset of the pixels of the same color of the second corrected version using second down sampling scale factors to generate corrected pixel values for pixels of the same color in a corrected version of the raw image. The pixels in the subset are arranged in the second direction, and the second down sampling scale factors gradually vary along the second direction.

BRIEF DESCRIPTION OF THE DRAWINGS

Figure (FIG. 1 is a high-level diagram of an electronic device, according to one embodiment.

Figure 1:
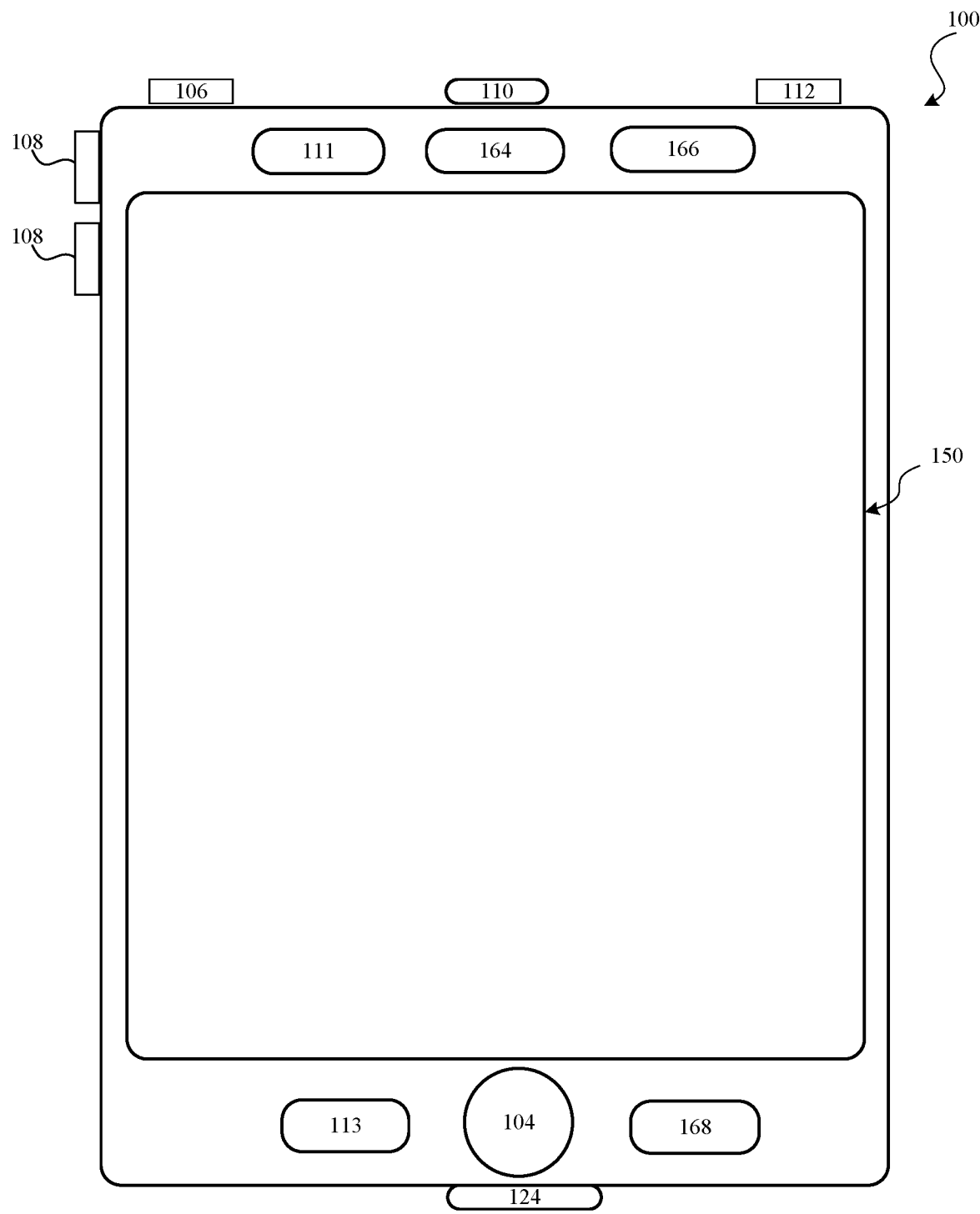

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a foveated down sampling and correction circuit in an image processor for correcting chromatic aberrations in captured images generated by one or more image sensors coupled to the image processor. The foveated down sampling and correction circuit includes a vertical foveated down sampling and correction circuit as well as a horizontal correction circuit coupled to an output of the vertical foveated down sampling and correction circuit. The vertical foveated down sampling and correction circuit performs the combined foveated down sampling and chromatic aberration recovery in the vertical direction of a raw image generated by the one or more image sensors. The vertical foveated down sampling and correction circuit generate first corrected pixel values for pixels of a same color in a first corrected version of the raw image. The horizontal correction circuit receives the first corrected pixel values from the vertical foveated down sampling and correction circuit, and performs chromatic aberration recovery in the horizontal direction of the first corrected version of the raw image. The horizontal correction circuit generates second corrected pixel values for pixels of the same color in a second corrected version of the raw image with chromatic aberrations reduced in comparison with the raw image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
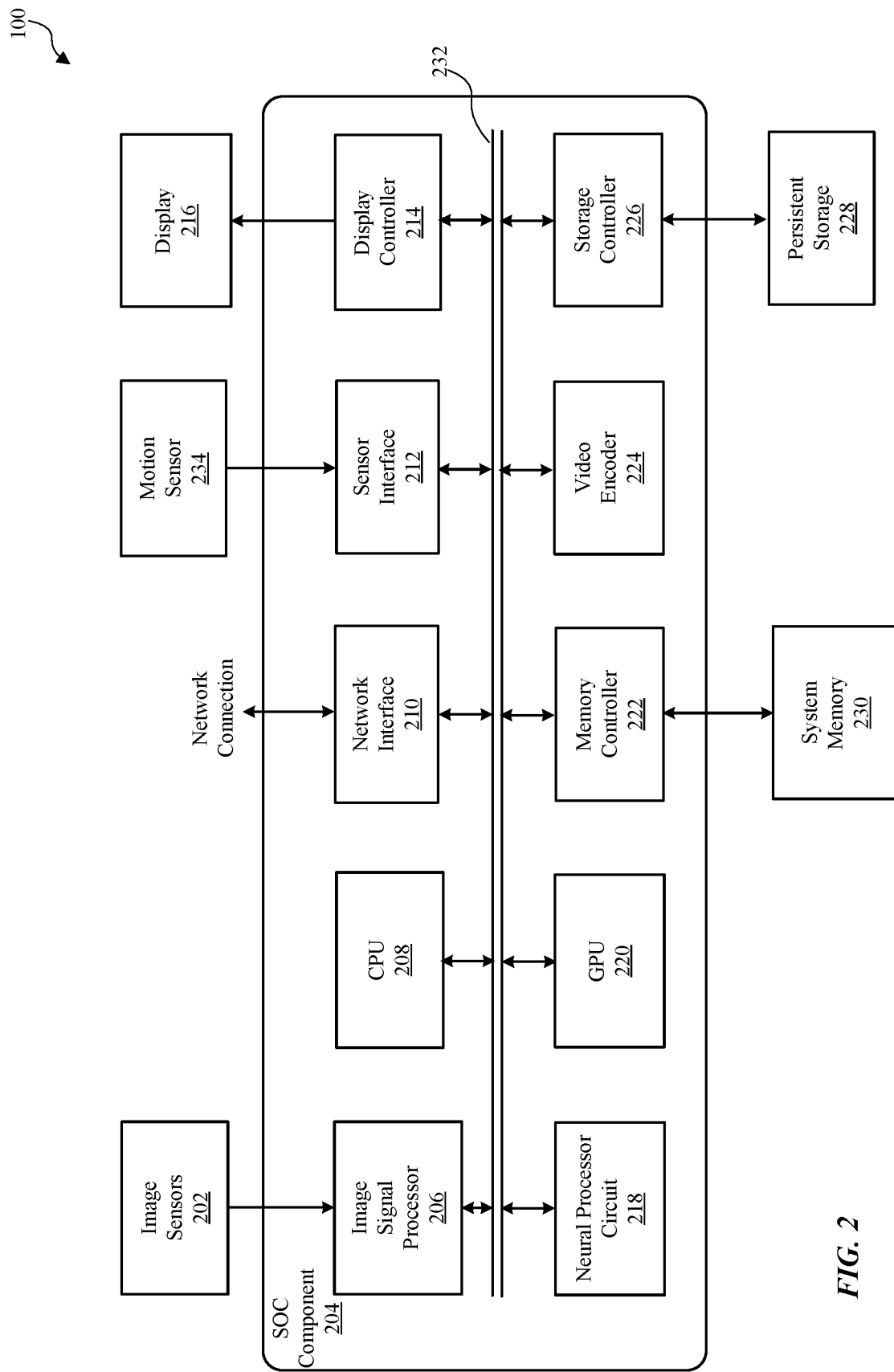
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensors 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensors 202 are components for capturing image data. Each of image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). Image sensor 202 may also include optical and mechanical components that assist image sensing components (e.g., pixels) to capture images. The optical and mechanical components may include an aperture, a lens system, and an actuator that controls the focal length of image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 216 may display various images, such as menus, selected operating parameters, images captured by image sensors 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, an image signal processor (ISP) 206, a central processor unit (CPU) 208, a network interface 210, a motion sensor interface 212, a display controller 214, a neural processor circuit 218, a graphics processor (GPU) 220, a memory controller 222, a video encoder 224, a storage controller 226, and various other input/output (I/O) interfaces, and a bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensors 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces are hardware, software, firmware, or combinations thereof for interfacing with various input/output components in device 100. I/O components may include devices such as keypads, buttons, audio devices, and sensors such as a global positioning system. I/O interfaces process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, GPU 220, or system memory 230, and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
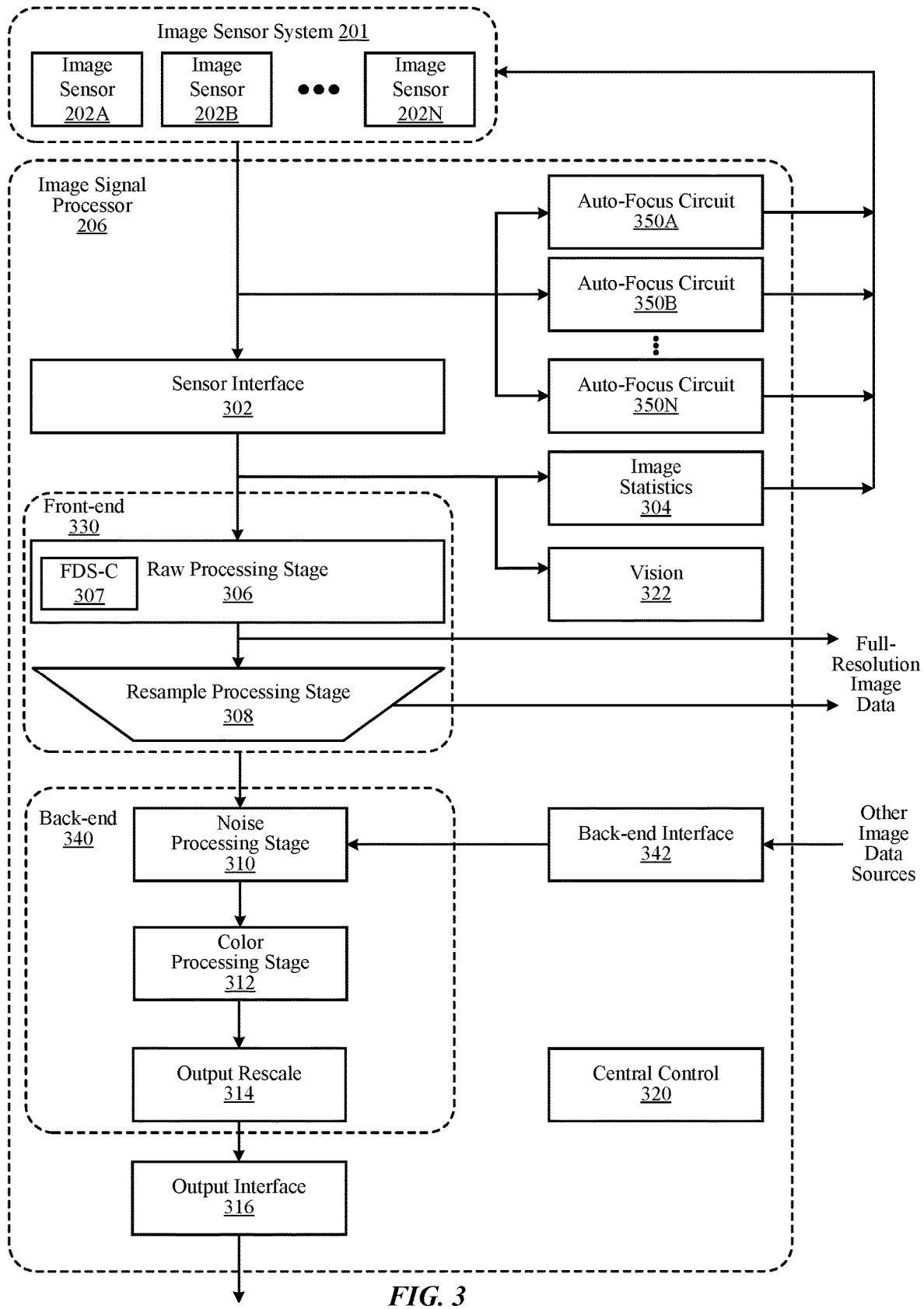
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. Image sensor system 201 may include one or more sub-systems that control image sensors 202 individually. In some cases, each image sensor 202 may operate independently while, in other cases, image sensors 202 may share some components. For example, in one embodiment, two or more image sensors 202 may share the same circuit board that controls the mechanical components of the image sensors (e.g., actuators that change the focal lengths of each image sensor). The image sensing components of image sensor 202 may include different types of image sensing components that may provide raw image data in different forms to ISP 206. For example, in one embodiment, the image sensing components may include multiple focus pixels that are used for auto-focusing and multiple image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if front-end pipeline stages 330 process two pixels per clock cycle, then raw processing stage 306 operations (e.g., black level compensation, highlight recovery and defective pixel correction) may process two pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., one pixel per clock cycle).

Raw image data captured by image sensors 202 may be transmitted to different components of ISP 206 in different manners. In one embodiment, raw image data corresponding to the focus pixels may be sent to auto-focus circuits 350 while raw image data corresponding to the image pixels may be sent to sensor interface 302. In another embodiment, raw image data corresponding to both types of pixels may simultaneously be sent to both auto-focus circuits 350 and sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. Auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to image sensor system 201 to control the focal lengths of image sensors 202. For example, image sensor 202 may include a control circuit that analyzes the auto-focusing data to determine a command signal that is sent to an actuator associated with the lens system of image sensor 202 to change the focal length of image sensor 202. The data generated by auto-focus circuits 350 may also be sent to other components of ISP 206 for other image processing purposes. For example, some of the data may be sent to image statistics module 304 to determine information regarding auto-exposure.

Auto-focus circuits 350 may be individual circuits that are separate from other components such as image statistics module 304, sensor interface 302, front-end 330 and back-end 340. This allows ISP 206 to perform auto-focusing analysis independent of other image processing pipelines. For example, ISP 206 may analyze raw image data from image sensor 202A to adjust the focal length of image sensor 202A using auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of image sensor 202. Device 100 may perform auto focusing for different image sensors 202 even if one or more image sensors 202 are not in active use. This allows a seamless transition between two image sensors 202 when device 100 switches from one image sensor 202 to another. For example, in one embodiment, device 100 may include a wide-angle camera and a telephoto camera as a dual back camera system for photo and image processing. Device 100 may display images captured by one of the dual cameras and may switch between the two cameras from time to time. The displayed images may seamless transition from image data captured by one image sensor 202 to image data captured by another image sensor 202 without waiting for second image sensor 202 to adjust its focal length because two or more auto-focus circuits 350 may continuously provide auto-focus data to image sensor system 201.

Raw image data captured by different image sensors 202 may also be transmitted to sensor interface 302. Sensor interface 302 receives raw image data from image sensors 202 and processes the raw image data into an image data processable by other stages in the pipeline. Sensor interface 302 may perform various preprocessing operations, such as image cropping, binning or scaling to reduce image data size. In some embodiments, pixels are sent from image sensors 202 to sensor interface 302 in raster order (e.g., horizontally, line by line). The subsequent processes in the pipeline may also be performed in raster order and the result may also be output in raster order. Although only a single image sensor system 201 and a single sensor interface 302 are illustrated in FIG. 3, when more than one image sensor system is provided in device 100, a corresponding number of sensor interfaces may be provided in ISP 206 to process raw image data from each image sensor system.

Front-end pipeline stages 330 process image data in raw or full-color domains. Front-end pipeline stages 330 may include, but are not limited to, raw processing stage 306 and resample processing stage 308. A raw image data may be in a Bayer raw image format, for example. In the Bayer raw image format, pixel data with values specific to a particular color (instead of all colors) is provided in each pixel. In an image capturing sensor, image data is typically provided in the Bayer pattern. Raw processing stage 306 may process image data in the Bayer raw image format.

The operations performed by raw processing stage 306 include, but are not limited, sensor linearization, black level compensation, fixed pattern noise reduction, defective pixel correction, raw noise filtering, lens shading correction, white balance gain, highlight recovery, and chromatic aberration recovery (or correction). Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in the Bayer pattern).

A foveated down sampling and correction (FDS-C) circuit 307 in raw processing stage 306 performs the chromatic aberration recovery by performing foveated down sampling and aberration correction. The chromatic aberration recovery performed by FDS-C circuit 307 refers to correcting chromatic aberrations in raw image data resulting from the use of wide-angle lenses in image sensors 202 to generate raw images. Details about a structure and operation of FDS-C circuit 307 are provided in relation to FIG. 6, FIGS. 7A-7B, and FIG. 9. Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in the Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGG format into YCbCr format for further processing. In another embodiment, resample processing state 308 concerts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics module 304. In such embodiments, each statistic module may be programmed by central control module 320 to collect different information for the same or different image data.

Vision module 322 performs various operations to facilitate computer vision operations at CPU 208 such as facial detection in image data. Vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by central control module 320) may be bilinearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, the output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Chromatic Aberration Recovery

Figures 4A, 4B:
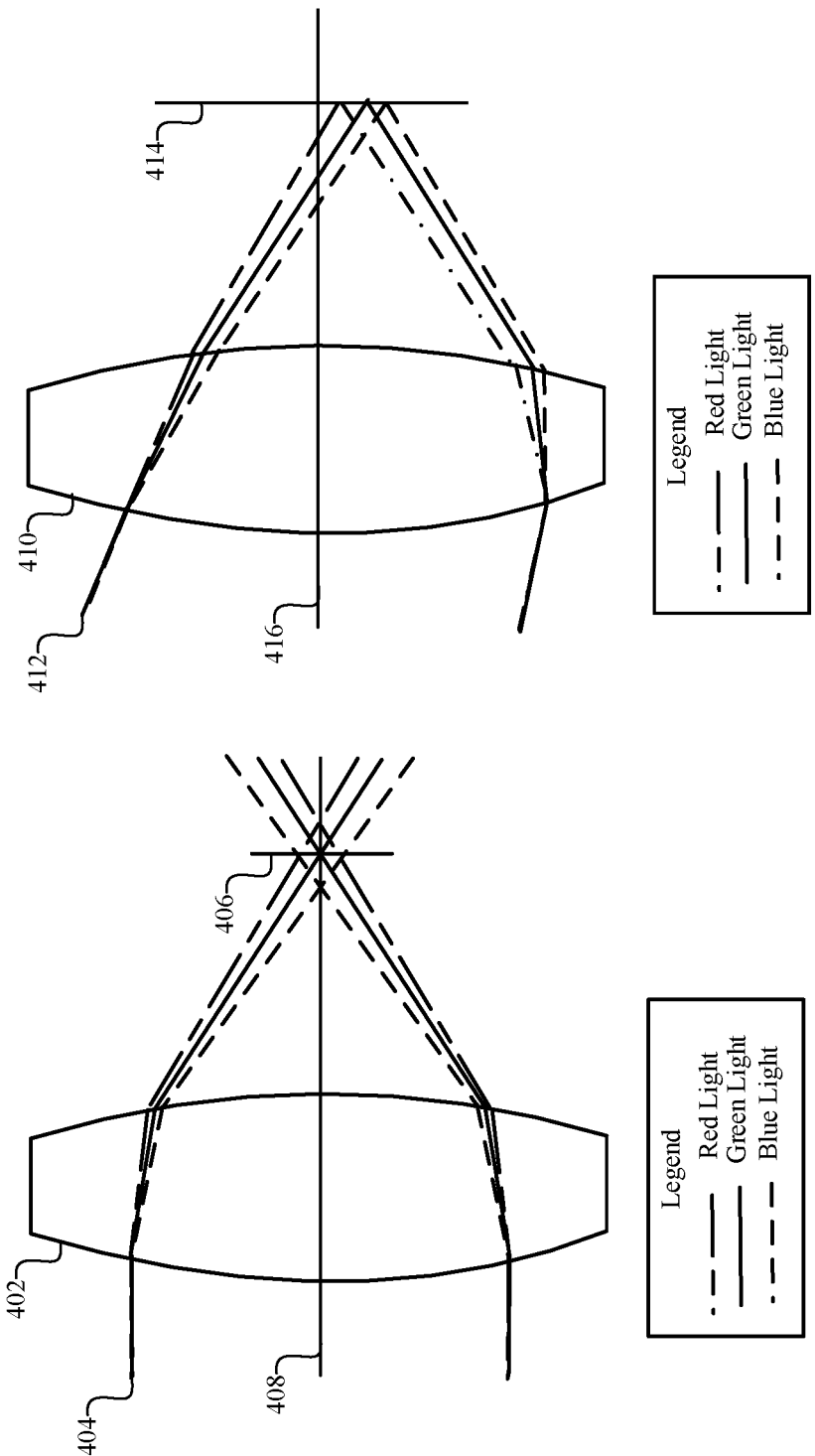
FIG. 4A is a conceptual diagram illustrating longitudinal/axial chromatic aberration, according to one embodiment.
FIG. 4B is a conceptual diagram illustrating lateral/transverse chromatic aberration, according to one embodiment.

In general, chromatic aberration is caused by the inability of a lens to focus different wavelengths of light (e.g., different colors of light) to the same focal point. FIG. 4A illustrates an example of longitudinal (e.g., axial) chromatic aberration. As shown in FIG. 4A, a wide-angle lens 402 refracts light 404 such that different wavelengths of light (e.g., red light, green light, and blue light) are focused at different distances from wide-angle lens 402 (e.g., at different distances from a focal plane 406) along an optical axis 408. FIG. 4B illustrates lateral (e.g., transverse) chromatic aberration, according to one embodiment. As shown in FIG. 4B, a wide-angle lens 410 refracts light 412 such that different wavelengths of light (e.g., red light, green light, and blue light) are focused at different positions on a focal plane 414 (e.g., at different distances from an optical axis 416). Chromatic aberration due to the usage of wide-angle lenses 402, 410 as described with respect to FIGS. 4A and 4B manifests itself as color fringing at edges in full color images.

Figure 5:
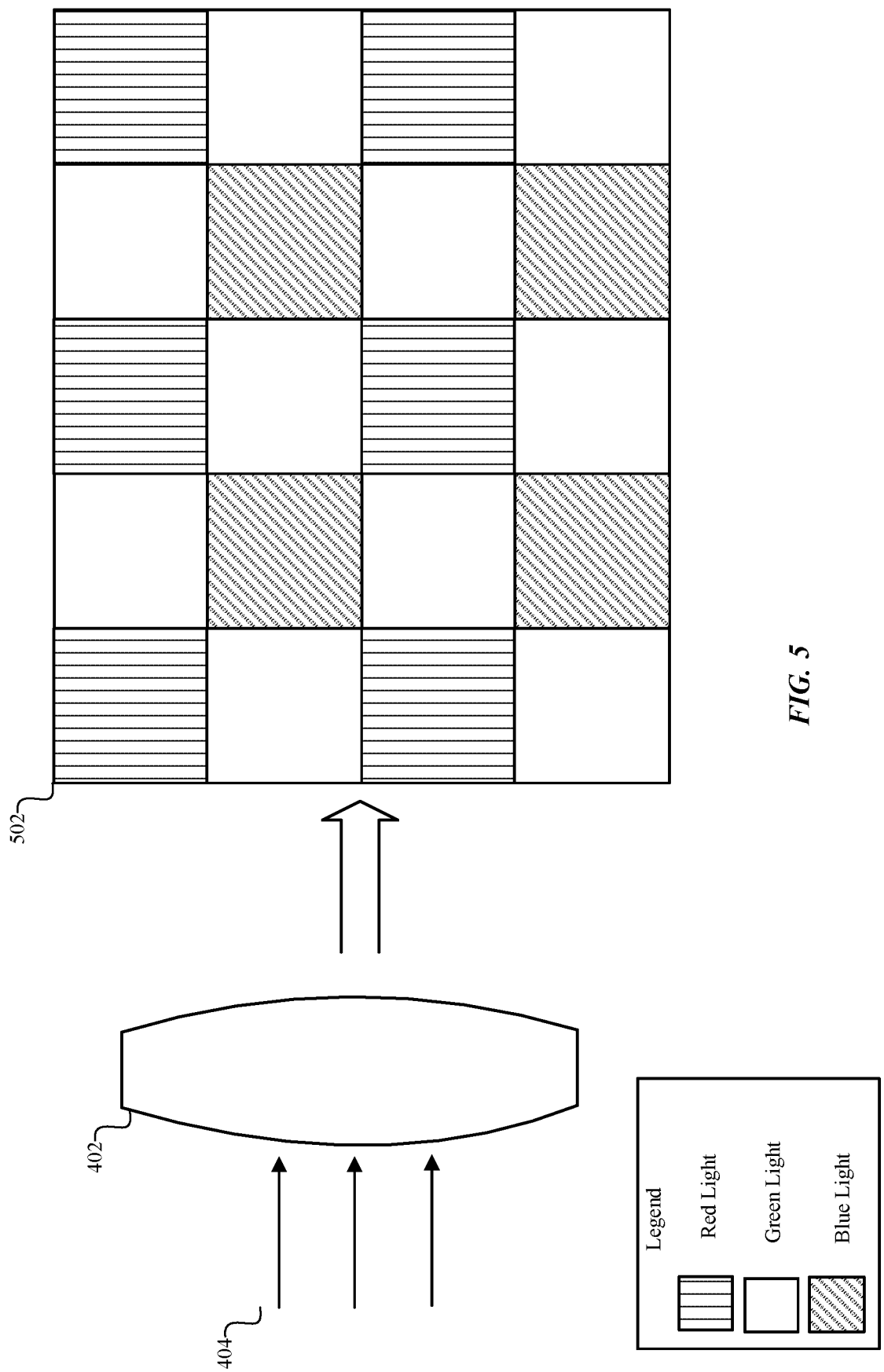
FIG. 5 is a conceptual diagram illustrating raw image data generated by an image sensor using a wide-angle lens, according to one embodiment.

FIG. 5 illustrates raw image data generated using light 404 captured by image sensor 202 using wide-angle lens 402, according to one embodiment. As shown in FIG. 5, the raw image data is in a Bayer pattern 502. Bayer pattern 502 includes alternating rows of red-green pixels and green-blue pixels. Generally, Bayer pattern 502 includes more green pixels than red or blue pixels due to the human eye being more sensitive to green light than both red light and blue light.

Example Foveated Down Sampling and Correction Circuit

Figure 6:
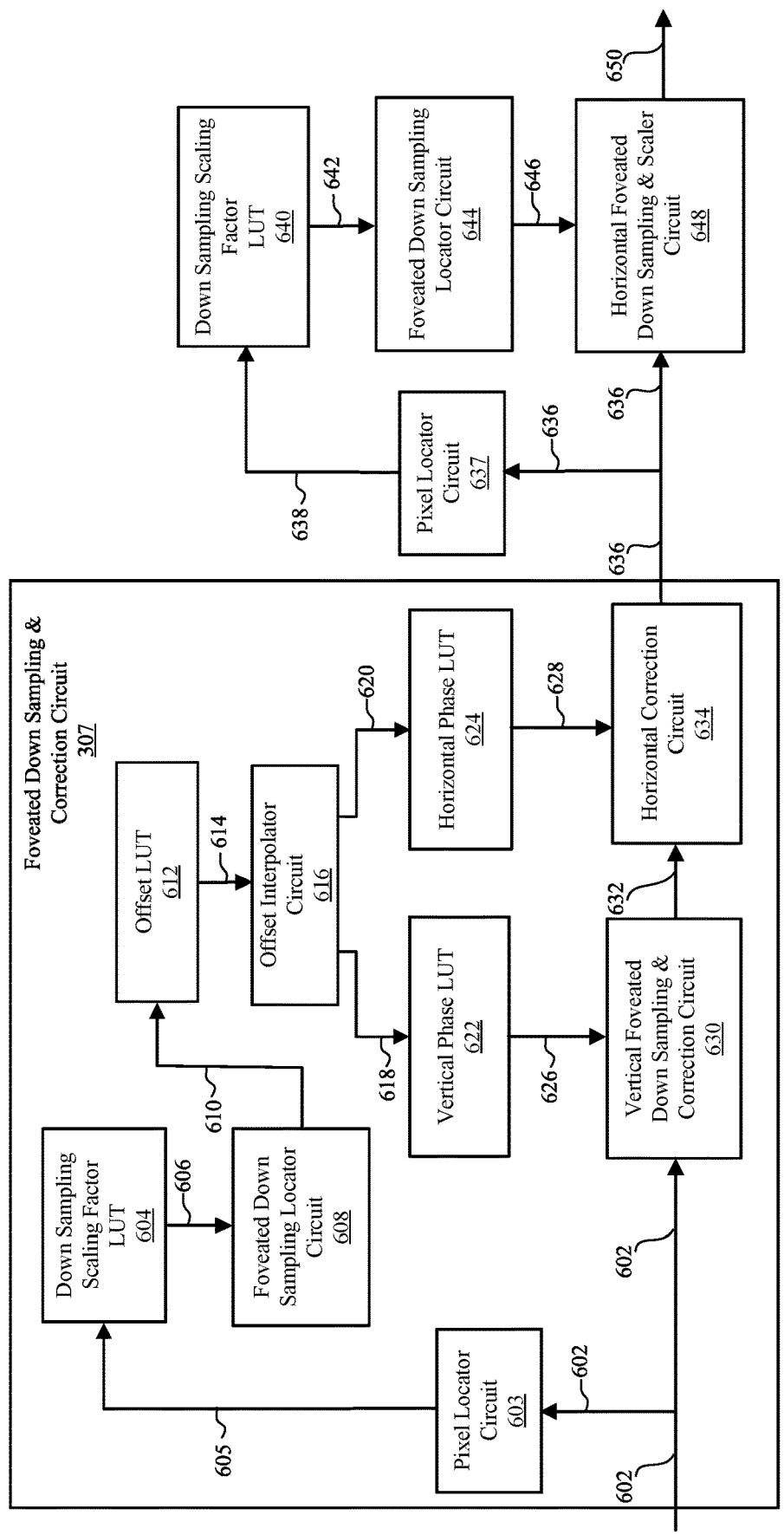
FIG. 6 is a block diagram illustrating a detailed view of a foveated down sampling and correction circuit, according to one embodiment.

FIG. 6 is a block diagram illustrating a detailed view of a foveated down sampling and correction (FDS-C) circuit 307, according to one embodiment. FDS-C circuit 307 corrects chromatic aberrations in raw image 602 generated by one or more image sensors 202. Specifically, FDS-C circuit 307 performs combined foveated down sampling and chromatic aberration recovery in a first direction (e.g., vertical direction) of raw image 602 to generate first corrected pixel values 632 of a first corrected version of raw image. FDS-C circuit 307 further performs chromatic aberration recovery in a second direction (e.g., horizontal direction) of the first corrected version of raw image to generate second corrected pixel values 636 of a second corrected version of raw image with reduced chromatic aberrations. In one or more embodiments, raw image 602 is in the Bayer pattern and is generated by at least one image sensor 202 using at least one wide-angle lens as described with respect to FIG. 5. A full-color image directly generated from raw image 602 would include chromatic aberrations due to utilizing the at least one wide-angle lens to generate raw image 602. By using second corrected pixel values 636 of the second corrected version to generate a full-color image rather than raw image 602, chromatic aberrations in the full-color image are reduced.

In one embodiment, FDS-C circuit 307 includes a pixel locator circuit 603, down sampling scaling factor look-up table (LUT) 604, a foveated down sampling locator circuit 608, an offset LUT 612, an offset interpolator circuit 616, a vertical phase LUT 622, a horizontal phase LUT 624, a vertical foveated down sampling and correction circuit 630, and a horizontal correction circuit 634. Additionally, FDS-C circuit 307 is coupled to a horizontal foveated down sampling and scaler circuit 648. In other embodiments, FDS-C circuit 307 may have additional or fewer circuits and LUTs than those shown in FIG. 6. For example, horizontal foveated down sampling and scaler circuit 648 may be part of FDS-C circuit 307.

Down sampling scaling factor LUT 604 stores down sampling scale factors indexed by locations in a first direction (e.g., vertical direction) of an image (e.g., raw image 602). Down sampling scaling factor LUT 604 receives indexing information 605 related to a location of a corresponding pixel along the first direction in raw image 602. Indexing information 605 for the corresponding pixel along the first direction in raw image 602 is extracted by pixel locator circuit 603. Upon receiving indexing information 605, down sampling scaling factor LUT 604 outputs a corresponding down sampling scaling factor 606 that is passed onto foveated down sampling pixel locator circuit 608.

Foveated down sampling locator circuit 608 receives down sampling scaling factor 606 from down sampling scaling factor LUT 604, and calculates a down sampling pixel location 610 (e.g., a down sampling landing) along the first direction of raw image 602. Information about down sampling pixel location 610 calculated by foveated down sampling locator circuit 608 is provided to offset LUT 612.

Offset LUT 612 stores a grid of pre-calculated horizontal and vertical offset values. A horizontal offset value and a vertical offset value for a certain pixel represent, respectively, a horizontal distance and a vertical distance to a virtual pixel with a pixel value that corresponds to a pixel value of the certain pixel had there not been any chromatic aberrations. The grid includes multiple grid points having multiple pixel offset values. The pre-calculated offset values in the grid may be associated with optical configurations of a corresponding image sensor 202 (e.g., use of a specific wide-angle lens). Thus, offset LUT 612 may store different sets of offset values that are each associated with different image sensors 202. In one or more embodiments, the grid is coarser than the arrangement of pixels of Bayer pattern 502. A particular pixel location may be associated with one or more grid points and includes four pixel offset values: a horizontal pixel offset value for the red pixels, a vertical pixel offset value for the red pixels, a horizontal offset value for the blue pixels, and a vertical offset value for the blue pixels. Horizontal offset values for the green pixels and vertical offset values for the green pixels may be set to zeroes.

Upon receiving information about down sampling pixel locations 610 in the first direction of raw image 602, offset LUT 612 may provide corresponding vertical offset values 614 to offset interpolator circuit 616. Furthermore, offset LUT 612 may provide corresponding horizontal offset values 614 to offset interpolator circuit 616 based on information about locations of a subset of pixels of raw image 602 arranged in a second direction (e.g., horizontal direction) perpendicular to the first direction.

Offset interpolator circuit 616 is coupled to offset LUT 612 and receives pre-calculated horizontal and vertical offset values 614 from offset LUT 612. In one embodiment, offset interpolator circuit 616 calculates horizontal and vertical offset values for subsets of pixels (e.g., blue and red pixels) included in raw image 602. Specifically, offset interpolator circuit 616 calculates first offset values 618 (e.g., vertical offset values) of a blue or red pixel by performing interpolation on pre-calculated vertical offset values 614. Furthermore, offset interpolator circuit 616 calculates second offset values 620 (e.g., horizontal offset values) of a blue or red pixel by performing interpolation on pre-calculated vertical offset values of grid points surrounding the blue or red pixel as described below with reference to FIG. 8. That is, for each red or blue pixel in raw image 602, offset interpolator circuit 616 calculates a horizontal pixel offset for the red color channel of the pixel, a vertical pixel offset value for the red color channel of the pixel, a horizontal pixel offset for the blue color channel of the pixel, and a vertical pixel offset value for the blue color channel of the pixel. In one or more embodiments, offset interpolator circuit 616 does not calculate vertical and horizontal pixel offsets for the green color channel of the pixel (e.g., vertical and horizontal pixel offsets for the green color channel are zero). However, in one or more other embodiments, offset interpolator circuit 616 may also calculate a horizontal pixel offset for the green color channel of the pixel and a vertical pixel offset value for the green color channel of the pixel. Generally, when the horizontal and vertical pixel offsets for two color channels are calculated, the horizontal and vertical pixel offsets for the remaining color channel (RGB) are not calculated.

Figure 7A:
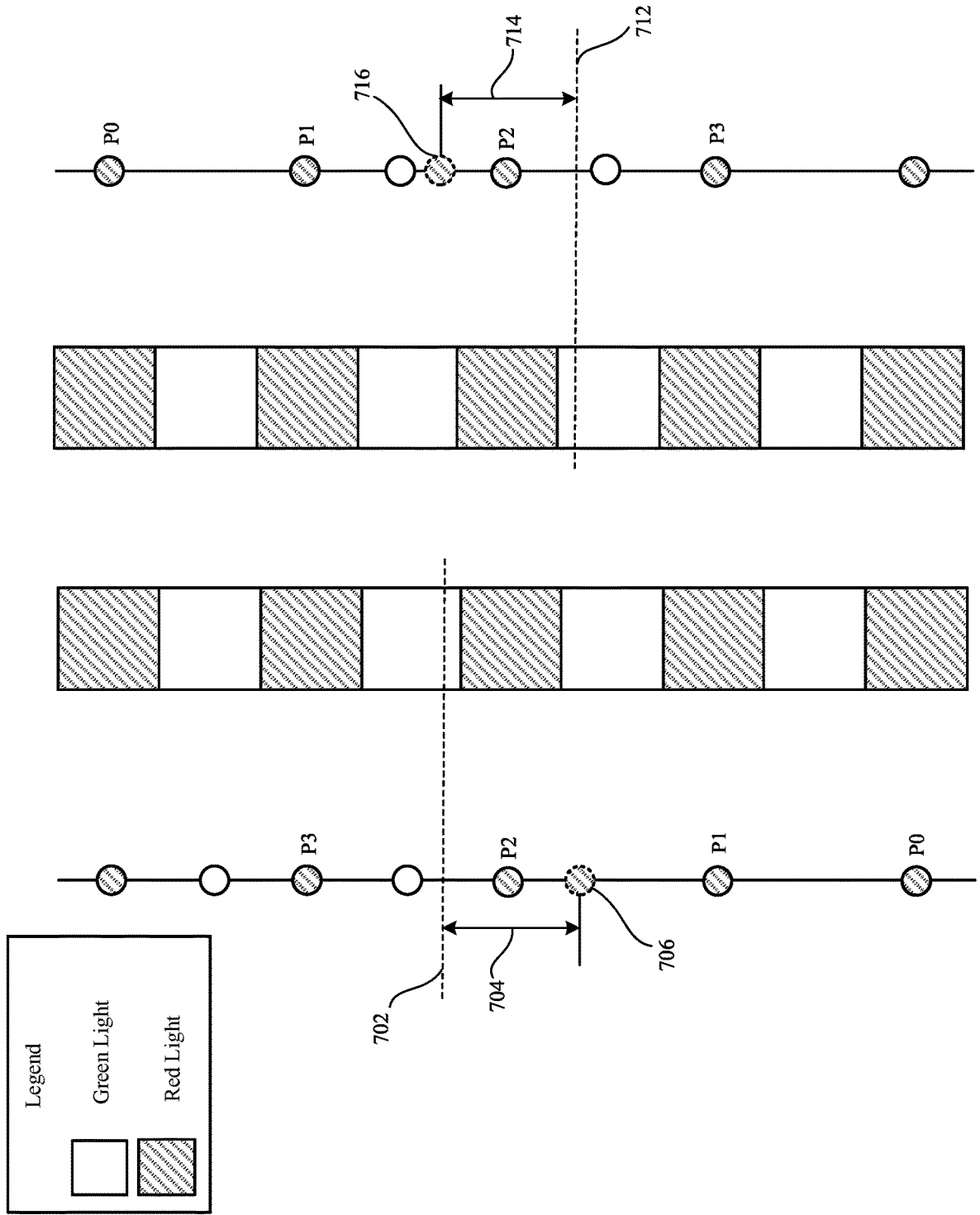
FIG. 7A is a conceptual diagram illustrating a combined vertical foveated down sampling and interpolation of the raw image data, according to one embodiment.

FIG. 7A illustrates vertical foveated down sampling and interpolation based on vertical offset pixel correction for a red color channel of a subset of pixels included in raw image 602, according to one embodiment. Due to chromatic aberration in the vertical direction, the pixel value of red pixel P2 captured by image sensor 202 (as part of Bayer pattern 502) is inaccurate. A corrected pixel value (e.g., first corrected pixel value 632) at a down sampling pixel location 702 is obtained using a pixel value of a virtual pixel 706 at location obtained by offsetting down sampling pixel location 702 (if there is no horizontal shifting of a focal point due to chromatic aberrations) vertically by a distance 704 (e.g., a negative vertical pixel offset). Thus, the corrected pixel value is generated at down sampling pixel location 702 and output from vertical foveated down sampling and correction circuit 630 as first corrected pixel value 632. Similarly, for a positive vertical pixel offset, a corrected pixel value (e.g., first corrected pixel value 632) at a down sampling pixel location 712 is obtained using a pixel value of a virtual pixel 716 at location obtained by offsetting down sampling pixel location 712 vertically by a distance 714 (e.g., the positive vertical pixel offset). Thus, the corrected pixel value is generated at down sampling pixel location 712 and output from vertical foveated down sampling and correction circuit 630 as first corrected pixel value 632.

As will be further described below, first offset value 704 (or first offset value 714) is used as a parameter to obtain a phase value for a bilinear or bicubic interpolation (e.g., equal to a distance from location of virtual pixel 706 to red pixel P2, and similarly equal to a distance from location of virtual pixel 716 to red pixel P2). The phase value is used to obtain interpolation coefficients for the bilinear or bicubic interpolation of pixel values of neighboring red pixels P0, P1, P2, and P3 in the vertical direction to compute the pixel value of virtual pixel 706 (or virtual pixel 716). The computed pixel value of virtual pixel 706 (or the computed pixel value of virtual pixel 716) then becomes first corrected pixel value 632 output from vertical foveated down sampling and correction circuit 630 at down sampling pixel location 702 (or at down sampling pixel location 712). Such corrections of pixel values and pixel locations are performed for all red pixels to account for the vertical chromatic aberration and/or the vertical foveated down sampling. The blue color channel of pixels also have their vertical offset corrected in a similar manner as the red color channel of pixels shown in FIG. 7A.

Figure 7B:
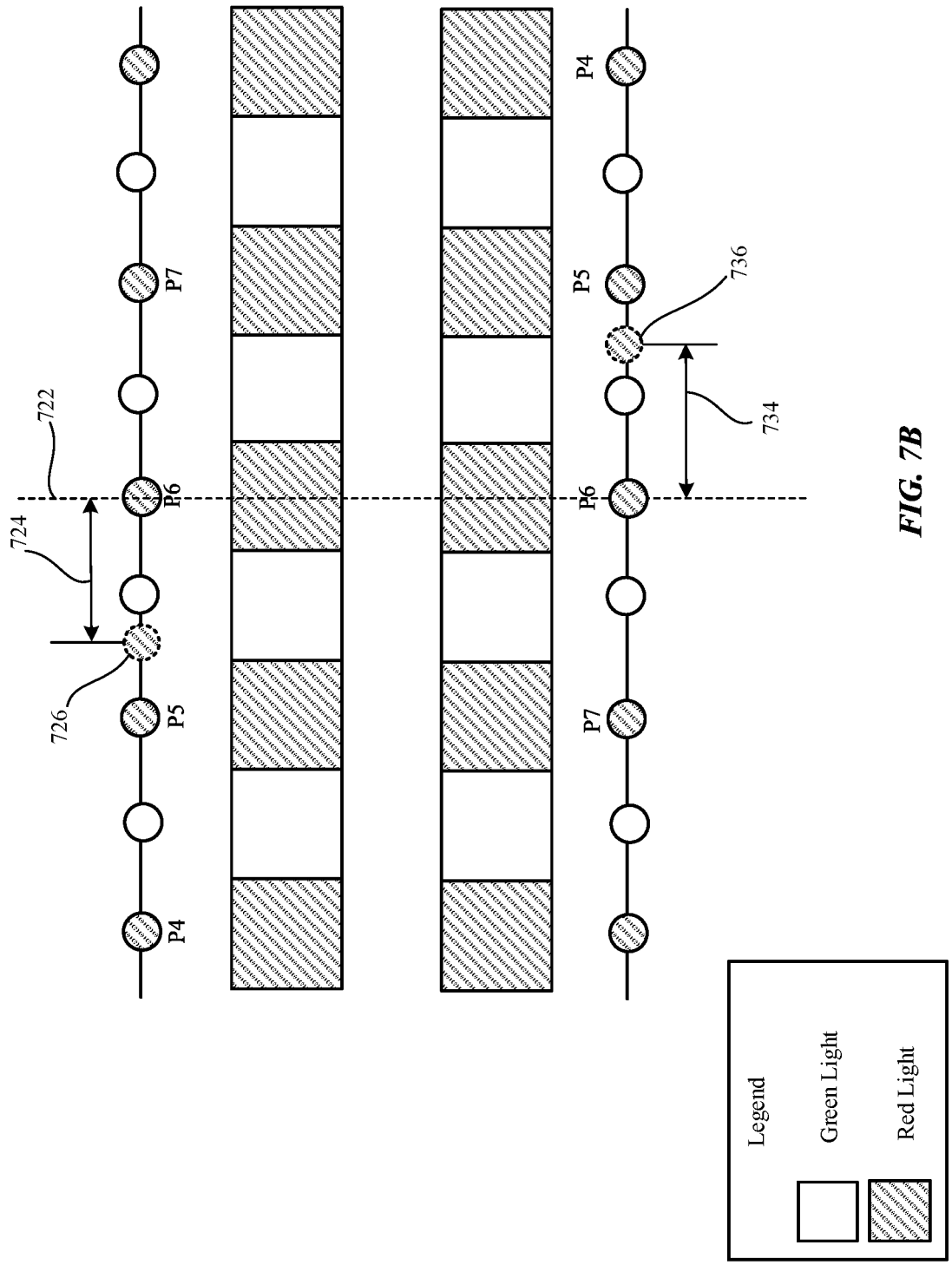
FIG. 7B is a conceptual diagram illustrating a horizontal interpolation of the raw image data, according to one embodiment, according to one embodiment.

FIG. 7B illustrates horizontal interpolation based on horizontal offset pixel correction for a red color channel of a subset of pixels, according to one embodiment. The red pixels in FIG. 7B have pixel values corrected using vertical offsets as explained above with reference to FIG. 7A. The pixel value of red pixel P6 corrected for the vertical chromatic aberration does not take into account the horizontal chromatic aberration. In order to account for the horizontal chromatic aberration, the pixel value of pixel P6 is replaced with a pixel value of a virtual pixel 726 (or a virtual pixel 736) that is horizontally offset from a location 722 of pixel P6 by a distance 724 (or a second offset value) for a negative horizontal pixel offset or by a distance 734 (or a second offset value) for a positive horizontal pixel offset. As will be further described below, second offset value 724 (or second offset value 734) is used as a parameter to interpolate pixel values of neighboring pixels P4, P5, P6, and P7 in the horizontal direction. Such replacement is performed across all red pixels to correct the horizontal chromatic aberration. The blue color channel of pixels also have their horizontal offset corrected in a similar manner as the red color channel of pixels shown in FIG. 7B.

Figure 8:
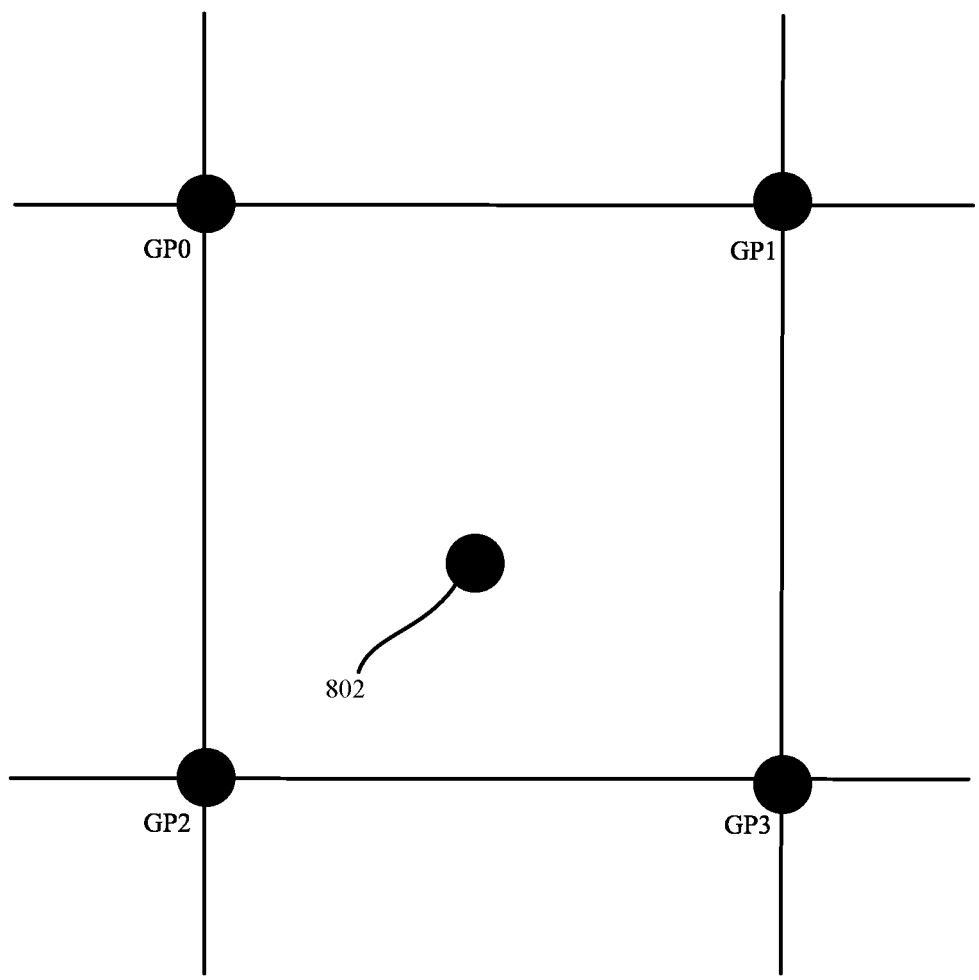
FIG. 8 is a diagram illustrating pixel neighbors of a given pixel, according to one embodiment.

FIG. 8 illustrates grid points GP0 through GP3 that surrounds a given pixel 802, according to one embodiment.

As described above, each of grid points GP0 through GP3 has an associated vertical and horizontal offset values for red and blue pixels stored in offset LUT 612. If pixel 802 is a red pixel, offset interpolator circuit 616 performs a bilinear interpolation or bicubic interpolation on four vertical offset values of the four grid points GP0 through GP3 for red pixels and generates an interpolated vertical offset value 618 for the red pixel. Offset interpolator circuit 616 also performs a bilinear interpolation or bicubic interpolation on four horizontal offset values of the four grid points GP0 through GP3 for red pixels and generates an interpolated horizontal offset value 620 for the red pixel. If pixel 802 is a blue pixel, offset interpolator circuit 616 performs a bilinear interpolation or bicubic interpolation on four vertical offset values of the four grid points GP0 through GP3 for blue pixels and generates an interpolated vertical offset value (or first offset value) 618 for blue red pixel, and performs a bilinear interpolation or bicubic interpolation on four horizontal offset values of the four grid points GP0 through GP3 for blue pixels and generates an interpolated horizontal offset value (or second offset value) 620 for the blue pixel.

Referring back to FIG. 6, offset interpolator circuit 616 provides, based on down sampling pixel locations 610 and pre-calculated vertical offset values 614, first offset values 618 (e.g., vertical pixel offset values) for the red and blue color channels of each pixel in raw image 602 to vertical phase LUT 622. Offset interpolator circuit 616 further provides, based on pre-calculated horizontal offset values 614, second offset values 620 (e.g., horizontal pixel offset values) for the red and blue color channels to horizontal phase LUT 624. In one embodiment, vertical phase LUT 622 stores a table of interpolation coefficients (e.g., bicubic or bilinear interpolation coefficients) for multiple phases in the first (e.g., vertical) direction where each phase has a set of coefficients (e.g., interpolation coefficients $C_0$, $C_1$, $C_2$, and $C_3$). Similarly, horizontal phase LUT 624 stores a table of interpolation coefficients (e.g., bicubic or bilinear interpolation coefficients) for multiple phases in the second (e.g., horizontal) direction where each phase has a set of coefficients (e.g., interpolation coefficients $C_4$, $C_5$, $C_6$, and $C_7$). Each table of interpolation coefficients is pre-computed and is associated with the same wide-angle lens that is associated with offset LUT 612.

Vertical phase LUT 622 uses first offset values 618 (e.g., vertical pixel offsets) calculated for the red and blue color channels for each pixel to define the phase of bilinear or bicubic interpolation in the first (e.g., vertical) direction. Similarly, horizontal phase LUT 624 uses second offset values 620 (e.g., horizontal pixel offsets) calculated for the red and blue color channels for each pixel to define the phase of bilinear or bicubic interpolation in the second (e.g., horizontal) direction. The phase in each of the first (e.g., vertical) and second (e.g., horizontal) directions functions as an index to its respective set of coefficients in the respective vertical and horizontal phase LUT 622, 624.

Vertical phase LUT 622 identifies first interpolation coefficients 626 that are associated with first offset values 618 for a specific color channel and provides first interpolation coefficients 626 to vertical foveated down sampling and correction circuit 630. Similarly, horizontal phase LUT 624 identifies second interpolation coefficients 628 that are associated with second offset values 620 for the specific color channel and provides second interpolation coefficients 628 to horizontal correction circuit 634.

Vertical foveated down sampling and correction circuit 630 performs combined foveated down sampling and chromatic aberration recovery in the first (e.g., vertical) direction of raw image 602. Vertical foveated down sampling and correction circuit 630 calculates corrected pixel values 632 with chromatic aberrations corrected in the first direction relative to raw image 602. In one embodiment, vertical foveated down sampling and correction circuit 630 calculates vertically down sampled and corrected versions of the pixel values ($P_v$) of a specific color using interpolation, i.e., $$P_v = C_0 P_0 + C_1 P_1 + C_2 P_2 + C_3 P_3, \qquad (1)$$

where $P_0$ through $P_3$ represent pixel values of four pixels in a same column of raw image 602 and closest to a virtual pixel corresponding to the pixel whose value is being corrected to account for vertical chromatic aberration and/or vertical foveated down sampling, and $C_0$ through $C_3$ are first interpolation coefficients 626.

To calculate vertically corrected pixel value 632 for a pixel of a specific color, vertical foveated down sampling and correction circuit 630 obtains first interpolation coefficients 626 from vertical phase LUT 622 that retrieves first interpolation coefficients 626 (e.g., the set of interpolation coefficients $C_0$, $C_1$, $C_2$, and $C_3$) corresponding to first offset value 618 from vertical phase LUT 622. First offset value 618 represents a first distance (e.g., distance 704) from each down sampling pixel location 610 (or down sampling pixel location 702) to a corresponding virtual pixel (e.g., virtual pixel 706) in the first direction. Using first offset values 618 and first interpolation coefficients 626, vertical foveated down sampling and correction circuit 630 calculates corrected pixel value 632 of the specific color channel for the pixel closest to the virtual pixel using equation (1). Corrected pixel value 632 replaces the original pixel value for the specific color channel at down sampling pixel location 610 in the first direction.

Horizontal correction circuit 634 calculates pixel values 636 of a specific color channel with chromatic aberration corrected in the second (e.g., horizontal) direction relative to raw image 602. In one embodiment, horizontal correction circuit 634 calculates horizontally correction versions of pixel values 636 ($P_h$) using interpolation, i.e., $$P_h = C_4 P_4 + C_5 P_5 C_6 P_6 + C_7 P_7, \qquad (2)$$

where $P_4$ through $P_7$ represent pixel values of four pixels in a same row and closest to a virtual pixel corresponding to the pixel whose value is being corrected to account for horizontal chromatic aberration, and $C_4$ through $C_7$ are second interpolation coefficients 628.

To calculate horizontally corrected pixel value 636 for a pixel of a specific color, horizontal correction circuit 634 obtains second interpolation coefficients 628 from horizontal phase LUT 624 that retrieves second interpolation coefficients 628 (e.g., the set of coefficients $C_4$, $C_5$, $C_6$, and $C_7$) corresponding to second offset value 620 from horizontal phase LUT 624. Second offset value 620 represents a second distance (e.g., distance 724) from a pixel location (e.g., location of pixel $P_6$) to a corresponding virtual pixel (e.g., virtual pixel 726) in the second direction. Using second offset values 620 and second interpolation coefficients 628, horizontal correction circuit 634 calculates corrected pixel value 636 of the specific color channel for the pixel closest to the virtual pixel using equation (2). Corrected pixel value 636 replaces corresponding vertically corrected pixel value 632 at a same pixel location of vertically corrected pixel value 632 as no down sampling is performed by horizontal correction circuit 634.

Corrected pixel values 636 for pixels from raw image 602 represent a second corrected raw image 636 vertically down sampled with mitigated chromatic aberrations in vertical and horizontal directions. Second corrected raw image 636 can be used by image signal processor 206 to generate a full-color image with reduced chromatic aberrations.

Horizontal foveated down sampling and scaler circuit 648 is coupled to an output of FDS-C circuit 307. Horizontal foveated down sampling and scaler circuit 648 receives pixel values of second corrected raw image 636 and performs horizontal foveated down sampling and scaling to the pixel values of second corrected raw image 636.

Down sampling scaling factor LUT 640 stores second down sampling scale factors indexed by locations in the second direction (e.g., horizontal direction) of an image (e.g., corrected raw image 636). Down sampling scaling factor LUT 640 receives indexing information 638 related to a location of a corresponding pixel along the second direction in second corrected raw image 636. Indexing information 638 for the corresponding pixel along the second direction in second corrected raw image 636 is extracted by pixel locator circuit 637. Upon receiving indexing information 638, down sampling scaling factor LUT 640 outputs a corresponding second down sampling scaling factor 642 that is passed onto foveated down sampling locator circuit 644.

Foveated down sampling locator circuit 644 receives down sampling scaling factor 642 from down sampling scaling factor LUT 640, and calculates a down sampling pixel location 646 (e.g., down sampling landing) along the second direction of second corrected raw image 636. Information about down sampling pixel location 646 calculated by foveated down sampling locator circuit 644 is provided to horizontal foveated down sampling and scaler circuit 648.

Horizontal foveated down sampling and scaler circuit 648 performs down sampling of a subset of pixels of a same color of second corrected raw image 636 arranged in the second direction using second down sampling scale factors 642 gradually varying along the second direction to generate corrected pixel values for pixels of the same color in corrected raw image 650. The corrected pixel values of corrected raw image 650 replace pixel values 636 of the specific color channel at down sampling pixel locations 646.

Example Process of Foveated Down Sampling and Correction Circuit

Figure 9:
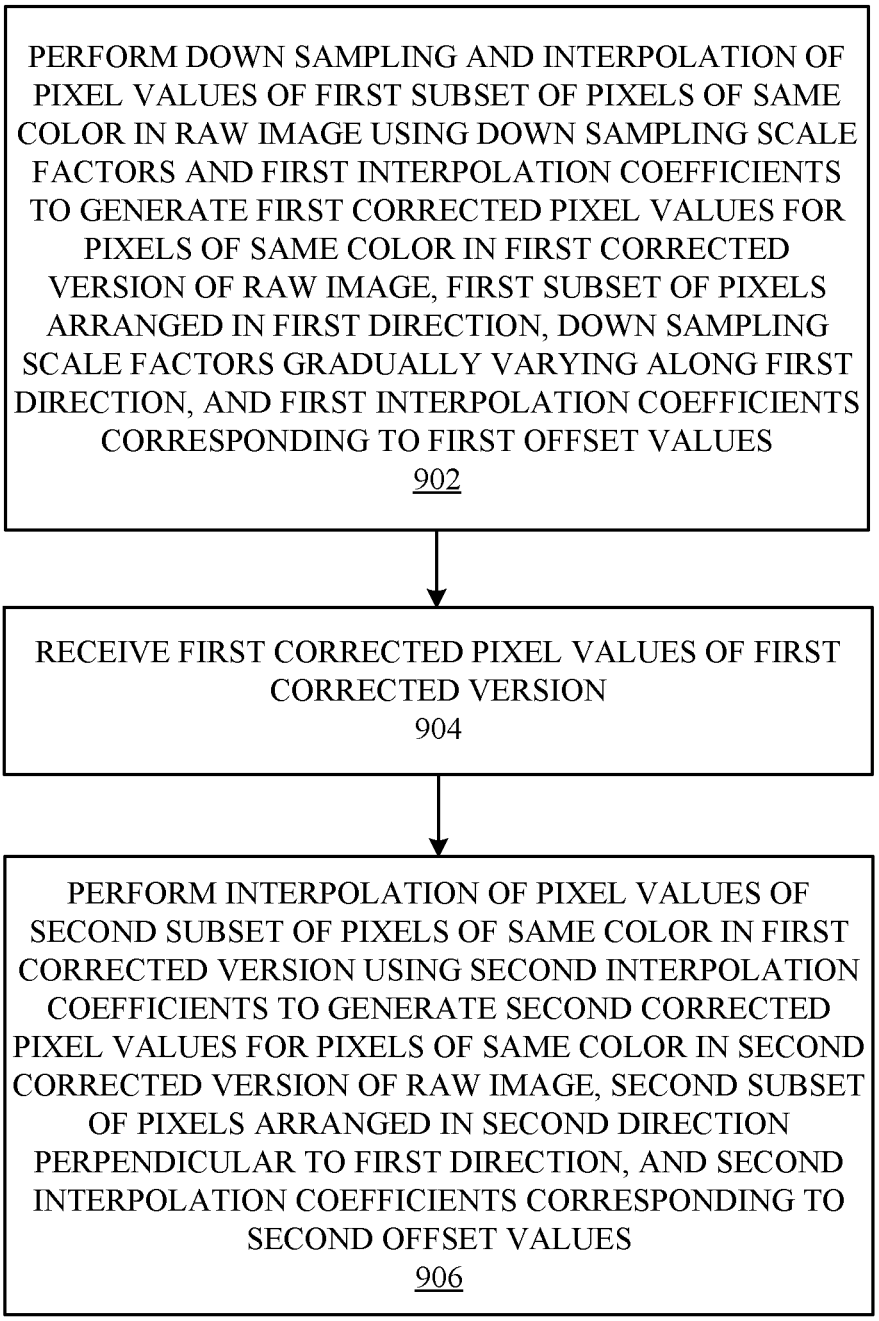
FIG. 9 is a flowchart illustrating a method of performing foveated down sampling and correction to reduce color fringing of the raw image data, according to one embodiment.

FIG. 9 is a flowchart illustrating a method of performing foveated down sampling and correction by an image processor (e.g., image signal processor 206) to reduce color fringing of raw image data, according to one embodiment. The image processor performs 902 (e.g., by vertical foveated down sampling and correction circuit 630) combined vertical foveated down sampling and interpolation of pixel values of a first subset of pixels of a same color in a raw image (e.g., pixels of raw image 602) using down sampling scale factors (e.g., first down sampling scale factors 606) and first interpolation coefficients (e.g., first interpolation coefficients 626) to generate first corrected pixel values (e.g., corrected pixel values 632) for pixels of the same color in a first corrected version of the raw image. The pixels in the first subset are arranged in a first direction (e.g., vertical direction), the down sampling scale factors gradually vary along the first direction, and the first interpolation coefficients correspond to first offset values (e.g., first offset values 618).

The first offset values represent first distances (e.g., distances 704, 714) from each down sampling pixel location (e.g., each down sampling pixel location 610, 702, 712) along the first direction to corresponding first virtual pixels (e.g., virtual pixels 706, 716) in the first direction. The image processor generates (e.g., by vertical foveated down sampling and correction circuit 630) one of the first corrected pixel values for a pixel in the first corrected version by down sampling and interpolating a number of pixels in the same column of the raw image using a corresponding one of the down sampling scale factors and a corresponding subset of the first interpolation coefficients.

The image processor receives 904 (e.g., by horizontal correction circuit 634) the first corrected pixel values (e.g., corrected pixel values 632) of the first corrected version. The image processor performs 906 (e.g., by horizontal correction circuit 634) interpolation of pixel values of a second subset of the pixels in the first corrected version using second interpolation coefficients (e.g., second interpolation coefficients 628) to generate second corrected pixel values (e.g., corrected pixel values 636) for pixels of the same color in a second corrected version of the raw image. The pixels in the second subset are arranged in a second direction (e.g., horizontal direction) perpendicular to the first direction, and the second interpolation coefficients correspond to second offset values (e.g., second offset values 620).

The second offset values represent second distances (e.g., distances 724, 734) from the second subset of pixels to corresponding second virtual pixels (e.g., virtual pixels 726, 736) in the second direction. The image processor generates (e.g., by horizontal correction circuit 634) one of the second corrected pixel values for a pixel in the second corrected version by interpolating a number of pixels in the same row of the first corrected version using a corresponding subset of the second interpolation coefficients.

The first subset of pixels are in a same column of the raw image having the Bayer pattern, and the second subset of pixels are in a same row of the first corrected version of the raw image having the Bayer pattern. A value of each down sampling scale factor depends on locations of a number of pixels in the same column of the raw image along the first direction, the number of pixels used for down sampling and interpolation to generate a corresponding corrected pixel value for a pixel in the first corrected version. In some embodiments, the down sampling scale factors are gradually varying along the first direction based on piecewise fixed scaling (e.g., the down sampling scale factors can be divided into up to five different regions), curvature continuous scaling, linear continuous scaling, some other scaling, or combination thereof. In one or more embodiments, one or more portions of the down sampling scale factors are gradually scaled down at each defined down sampling pixel location in the first direction, and one or more other portions of the down sampling scale factors are gradually scaled up at each defined down sampling pixel location in the first direction.

The image processor may further perform (e.g., by horizontal foveated down sampling and scaler circuit 648) horizontal foveated down sampling and scaling of the second corrected pixel values (e.g., corrected pixel values 636) for pixels of the same color in the second corrected version. The image processor may perform down sampling of a subset of the pixels of the same color of the second corrected version using second down sampling scale factors (e.g., second down sampling scaling factors 642) to generate corrected pixel values for pixels of the same color in a corrected version of the raw image (e.g., corrected raw image 650). The pixels in the subset are arranged in the second (e.g., horizontal) direction, and the second down sampling scale factors gradually vary along the second direction.

Embodiments of the process as described above with reference to FIG. 9 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image processor comprising:
   a first correction circuit configured to perform a down sampling and interpolation of pixel values of a first subset of pixels of a first color but not of a second color of a plurality of colors in a raw image using first down sampling scale factors for the first color and first interpolation coefficients for the first color to generate first corrected pixel values for the pixels of the first color in a first corrected version of the raw image, the first subset of the pixels of the first color arranged in a first direction, the first down sampling scale factors for the first color gradually varying along the first direction, and the first interpolation coefficients for the first color corresponding to first offset values for the first color; and
   a second correction circuit coupled to the first correction circuit, the second correction circuit configured to:
      receive the first corrected pixel values of the first corrected version, and
      perform interpolation of pixel values of a second subset of the pixels of the first color but not of the second color in the first corrected version using second interpolation coefficients for the first color to generate second corrected pixel values for the pixels of the first color in a second corrected version of the raw image, the second subset of the pixels of the first color arranged in a second direction perpendicular to the first direction, and the second interpolation coefficients for the first color corresponding to second offset values for the first color.

2. The image processor of claim 1, wherein:
   the first offset values for the first color represent first distances from each down sampling pixel location for the first color along the first direction to corresponding first virtual pixels of the first color in the first direction, and
   the second offset values for the first color represent second distances from the second subset of the pixels of the first color to corresponding second virtual pixels of the first color in the second direction.

3. The image processor of claim 1, wherein the first correction circuit is further configured to generate one of the first corrected pixel values for a pixel of the first color in the first corrected version by the down sampling and interpolating a number of pixels of the first color but not of the second color in a same column of the raw image using a corresponding one of the first down sampling scale factors for the first color and a corresponding subset of the first interpolation coefficients for the first color.

4. The image processor of claim 1, wherein the second correction circuit is further configured to generate one of the second corrected pixel values for a pixel of the first color in the second corrected version by interpolating a number of pixels of the first color but not of the second color in a same row of the first corrected version using a corresponding subset of the second interpolation coefficients for the first color.

5. The image processor of claim 1, wherein the first subset of the pixels of the first color are in a same column of the raw image having a Bayer pattern, and the second subset of the pixels of the first color are in a same row of the first corrected version of the raw image having the Bayer pattern.

6. The image processor of claim 1, wherein a value of each of the first down sampling scale factors for the first color depends on locations of a number of pixels of the first color in a same column of the raw image along the first direction, the number of pixels used for the down sampling and interpolation to generate a corresponding first corrected pixel value of the first color for a pixel of the first color in the first corrected version.

7. The image processor of claim 1, wherein the first down sampling scale factors for the first color are gradually varying along the first direction based on piecewise fixed scaling, curvature continuous scaling or linear continuous scaling.

8. The image processor of claim 1, wherein:
   one or more portions of the first down sampling scale factors for the first color are gradually scaled down at each defined down sampling pixel location for the first color in the first direction, and
   one or more other portions of the first down sampling scale factors for the first color are gradually scaled up at each defined down sampling pixel location for the first color in the first direction.

9. The image processor of claim 1, further comprising:
   a down sampling locator circuit configured to determine each down sampling pixel location for the first color in the first direction based on a corresponding one of the first down sampling scale factors for the first color.

10. The image processor of claim 1, further comprising:
    an offset interpolator circuit configured to determine the first offset values for the first color and the second offset values for the first color by at least performing bilinear interpolation or bicubic interpolation of predetermined first offset values for the first color and predetermined second offset values for the first color associated with grid points neighboring the pixels of the first color in the raw image.

11. The image processor of claim 10, further comprising:
    an offset look-up table configured to store the predetermined first offset values for the first color and the predetermined second offset values for the first color associated with the grid points;
    a first phase look-up table configured to store the first interpolation coefficients for the first color indexed by first distances from each down sampling pixel location for the first color along the first direction to corresponding first virtual pixels of the first color in the first direction or by first parameters derived from the first distances; and
    a second phase look-up table configured to store the second interpolation coefficients for the first color indexed by second distances from the second subset of the pixels to corresponding second virtual pixels in a same direction or by second parameters derived from the second distances.

12. The image processor of claim 1, further comprising a down sampling circuit coupled to the second correction circuit, the down sampling circuit configured to:
    receive the second corrected pixel values for the pixels of the first color in the second corrected version, and perform a down sampling of a subset of the pixels of the first color but not of the second color of the second corrected version using second down sampling scale factors for the first color to generate corrected pixel values for the pixels of the first color in a corrected version of the raw image, the subset of the pixels arranged in the second direction, and the second down sampling scale factors for the first color gradually varying along the second direction.

13. The image processor of claim 1, wherein the raw image includes the pixels in the plurality of colors of red, green, and blue, and wherein pixel values of pixels of two of the plurality of colors are updated by the second correction circuit, and pixel values of pixels of a remaining one of the plurality of colors are not updated by the second correction circuit.

14. A method comprising:
performing a down sampling and interpolation of pixel values of a first subset of pixels of a first color but not of a second color of a plurality of colors in a raw image using first down sampling scale factors for the first color and first interpolation coefficients for the first color to generate first corrected pixel values for the pixels of the first color in a first corrected version of the raw image, the first subset of the pixels of the first color arranged in a first direction, the first down sampling scale factors for the first color gradually varying along the first direction, and the first interpolation coefficients for the first color corresponding to first offset values for the first color; and
performing interpolation of pixel values of a second subset of the pixels of the first color but not of the second color in the first corrected version using second interpolation coefficients for the first color to generate second corrected pixel values for the pixels of the first color in a second corrected version of the raw image, the second subset of the pixels of the first color arranged in a second direction perpendicular to the first direction, and the second interpolation coefficients for the first color corresponding to second offset values for the first color.

15. The method of claim 14, wherein:
the first offset values for the first color represent first distances from each down sampling pixel location for the first color along the first direction to corresponding first virtual pixels of the first color in the first direction, and
the second offset values represent second distances from the second subset of the pixels of the first color to corresponding second virtual pixels of the first color in the second direction, and the method further comprising:
generating one of the first corrected pixel values for a pixel of the first color in the first corrected version by the down sampling and interpolating a number of pixels of the first color but not of the second color in a same column of the raw image using a corresponding one of the first down sampling scale factors for the first color and a corresponding subset of the first interpolation coefficients for the first color; and
generating one of the second corrected pixel values for a pixel of the first color in the second corrected version by interpolating a number of pixels of the first color but not of the second color in a same row of the first corrected version using a corresponding subset of the second interpolation coefficients for the first color.

16. The method of claim 14, wherein a value of each of the first down sampling scale factors for the first color depends on locations of a number of pixels of the first color in a same column of the raw image along the first direction, the number of pixels used for the down sampling and interpolation to generate a corresponding first corrected pixel value of the first color for a pixel of the first color in the first corrected version.

17. The method of claim 14, further comprising:
determining each down sampling pixel location for the first color along the first direction based on a corresponding one of the first down sampling scale factors for the first color.

18. A system, comprising:
at least one image sensor configured to capture a raw image; and
an image processor coupled to the at least one image sensor, the image processor comprising:
a first correction circuit configured to perform a down sampling and interpolation of pixel values of a first subset of pixels of a first color but not of a second color of a plurality of colors in the raw image using first down sampling scale factors for the first color and first interpolation coefficients for the first color to generate first corrected pixel values for the pixels of the first color in a first corrected version of the raw image, the first subset of the pixels of the first color arranged in a first direction, the first down sampling scale factors for the first color gradually varying along the first direction, and the first interpolation coefficients for the first color corresponding to first offset values for the first color, and
a second correction circuit coupled to the first correction circuit, the second correction circuit configured to:
receive the first corrected pixel values of the first corrected version, and
perform interpolation of pixel values of a second subset of the pixels of the first color but not of the second color in the first corrected version using second interpolation coefficients for the first color to generate second corrected pixel values for pixels of the first color in a second corrected version of the raw image, the second subset of the pixels of the first color arranged in a second direction perpendicular to the first direction, and the second interpolation coefficients for the first color corresponding to second offset values for the first color.

19. The system of claim 18, wherein:
the first offset values represent first distances from each down sampling pixel location for the first color along the first direction to corresponding first virtual pixels of the first color in the first direction,
the second offset values represent second distances from the second subset of the pixels of the first color to corresponding second virtual pixels of the first color in the second direction,
the first correction circuit is further configured to generate one of the first corrected pixel values for a pixel of the first color in the first corrected version by the down sampling and interpolating a number of pixels of the first color but not of the second color in a same column of the raw image using a corresponding one of the first down sampling scale factors for the first color and a corresponding subset of the first interpolation coefficients for the first color, and the second correction circuit is further configured to generate one of the second corrected pixel values for a pixel of the first color in the second corrected version by interpolating a number of pixels of the first color but not of the second color in a same row of the first corrected version using a corresponding subset of the second interpolation coefficients for the first color.

20. The system of claim 18, wherein the image processor further comprises a down sampling locator circuit coupled to the first correction circuit, the down sampling locator circuit configured to:

determine each down sampling pixel location for the first color in the first direction based on a corresponding one of the first down sampling scale factors for the first color.

* * * * *